United States Patent [19]

Thenaisie et al.

[11] Patent Number: 4,813,879
[45] Date of Patent: Mar. 21, 1989

[54] SELF-LOCKING CONNECTION DEVICE FOR A CARD HAVING END CONTACT AREAS

[75] Inventors: Jacky Thenaisie, Le Mans; Michel Lenoir, Montfort Le Genois, both of France

[73] Assignee: Souriau & Cie, France

[21] Appl. No.: 146,092

[22] Filed: Jan. 20, 1988

[30] Foreign Application Priority Data

Jan. 30, 1987 [FR] France ............... 87 01143

[51] Int. Cl.$^4$ .............................................. H05K 1/00
[52] U.S. Cl. ..................................... 439/59; 439/70; 439/152; 439/325
[58] Field of Search .................... 439/59–62, 439/76, 152, 260, 267, 325–328, 629–637, 70

[56] References Cited

U.S. PATENT DOCUMENTS

| 3,317,885 | 5/1967 | Yost | 339/176 |
| 4,498,047 | 2/1985 | Hexamer et al. | 439/59 |
| 4,636,022 | 1/1987 | Sonobe | 439/326 |
| 4,737,578 | 4/1988 | Reichardt et al. | 439/152 |

FOREIGN PATENT DOCUMENTS 0201236 11/1986 European Pat. Off. .

Primary Examiner—David Pirlot
Attorney, Agent, or Firm—Larson and Taylor

[57] ABSTRACT

A connector device is provided for receiving a smart card having a plurality of electric contact areas distributed along a forward edge. The device has a reception case having a card introduction passage with a stop limiting insertion of the card. Flexible contact blades are placed so as to bear on the areas and to exert on the card a force tending to move it away from the stop; a resilient bolt is carried by the case and cooperates with a cam formed on the end part of the card. The end part of the card, the cam means and the bolt have a construction such that full insertion of the card and return under the action of the blades cause locking of the card in a set contact position and that a second thrust exerted by the card frees the cam means from the bolt.

7 Claims, 3 Drawing Sheets

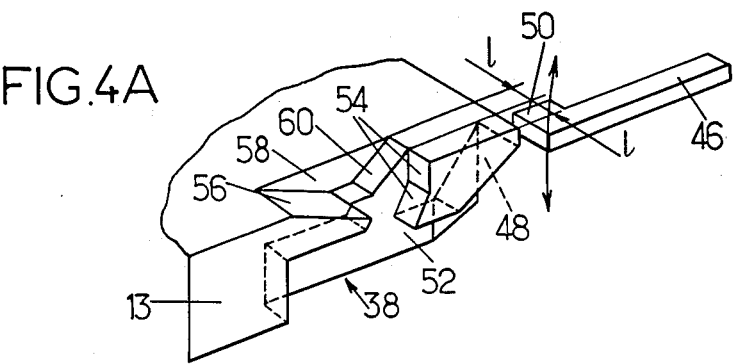
FIG.4A
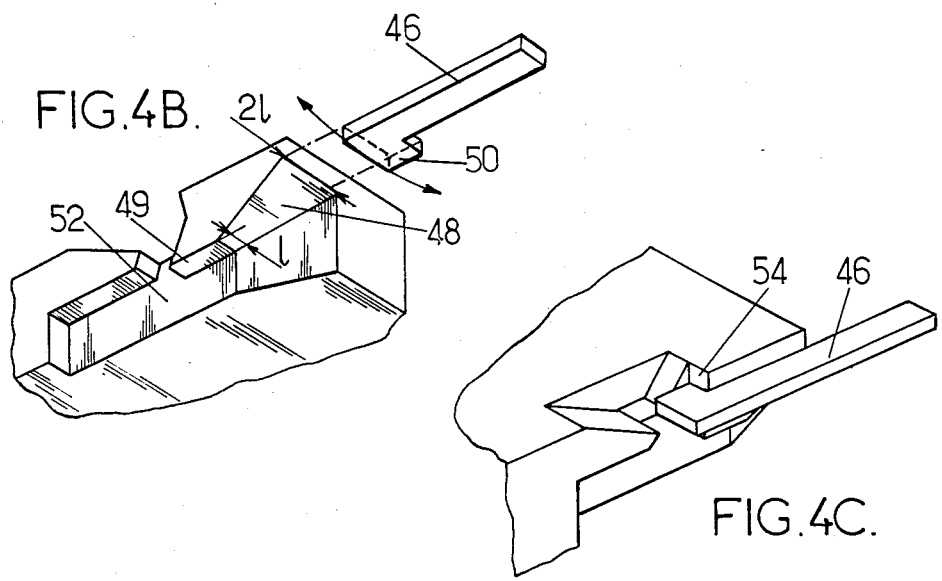
FIG.4B.
FIG.4C.
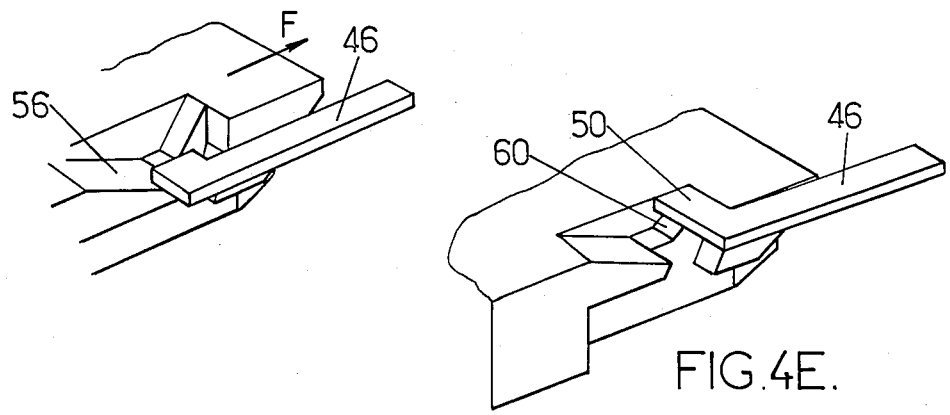
FIG.4D.
FIG.4E.

SELF-LOCKING CONNECTION DEVICE FOR A CARD HAVING END CONTACT AREAS

BACKGROUND OF THE INVENTION

1. Field of the Art

The invention relates to systems including cards having end electric contact areas and shaped to be introduced in a case having a connection device for establishing electric connections with the contact areas of the card. The invention is particularly suitable for use in systems for reading so-called smart or memory cards, formed by a plate a few millimeters thick containing electronic data storage and processing components, which must have a large number of contacts, often exceeding 40. The connection device must be able to undergo several tens of thousands of connection and disconnection operations without damage.

The invention is however not limited to that use and it is suitable whenever it is necessary or desirable to provide a connection device which must undergo a large number of operations before it requires maintenance or repair.

2. Prior Art

Card readers are already known including a drive mechanism which picks up the card and moves it into a predetermined reading position where it remains, inaccessible to the user, during the whole duration of the transaction. Such readers are costly and bulky and are acceptable for bank terminals only.

Simple readers are also known in which the card is simply slid into a case until a preset abutment position is reached, for which electric connections take place between contact areas provided on the card and sliding contacts of the reader. This approach causes rapid wear of the contact areas.

SUMMARY OF THE INVENTION

It is an object of the invention to provide an improved self-locking connection device for cards having end electric contact areas; it is a more specific object to provide a reading apparatus which is simple in construction, reduces the wear of the contacts and consequently makes possible a high number of connections and disconnections between maintenance or repair operations, it is a further object to achieve self-locking of the card in a preset reference position of the contact elements.

To this end, the invention provides a connection device including: a reception case having a card introduction passage with a stop limiting insertion of the card, flexible contact blades placed so as to come to bear on said areas before the card abuts against the stop and to exert on the card a force tending to move it away from the stop; and a resilient bolt carried by the case and cooperating with cam means formed on the end part of the card, the cam means and the bolt having a construction such that insertion of the card into its abutment position and return under the action of the blades cause locking of the card in the set contact position and that a second thrust exerted through the card frees the cam means from the bolt.

The term "card" used above and in the following description must be understood in a broad sense and does not necessarily designate a flat one-piece object. In the application of the invention to a connection device belonging to a smart card reading system for example, the "card" will be generally formed as a body, forming the active part and containing the electronic components, and a frame in which the body is contained and which comprises a connecting strip formed with contact areas.

The bolt may have a number of different constructions. It may include a blade having a locking end stud which engages in a cam in the form of a groove formed in the end part of the card, on a side edge thereof, the blade being flexible transversely to the plane of the card and carried by a lever movable about an axis perpendicular to the plane of introduction of the card. So that the user of the card cannot pull it out in an attempt to remove it, which might risk breaking the bolt, the passage formed in the case advantageously has a depth such that the edge of the card opposite that which comprises the contact areas comes flush with the entrance of the passage when the card is in set abutment position.

To avoid the risk of accidently forming an electric connection with the contacts, or of polluting the contacts (for example by the fingers of the user), the electric contact areas are typically formed on the bottom of parallel notches or grooves formed on the end part of the card and opening onto the edge situated at the front of the card in the introduction direction.

The invention will be better understood from the following description of a particular embodiment of the invention given by way of example. The description refers to the accompanying drawings.

SHORT DESCRIPTION OF THE DRAWINGS

FIG. 4A to 4E show the successive positions taken up by the bolt and the cam during connection and disconnection operations.

DETAILED DESCRIPTION OF A PREFERRED EMBODIMENT

The connection device of the invention may be regarded as including means carried by each of the cards to be used and means carried by each of the reading apparatus intended to receive them.

Figure 1:
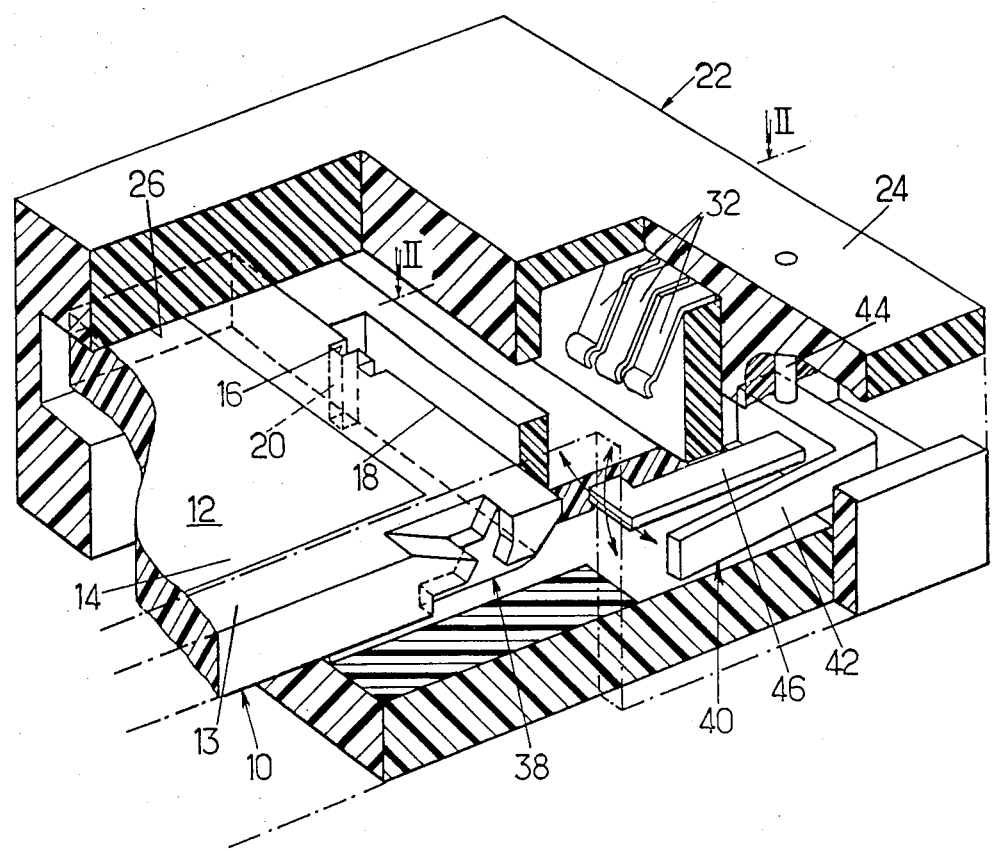
FIG. 1 is a schematical perspective view, with parts cut away, showing the general construction of the mechanical locking means of a device of the invention.

Referring to FIG. 1, part of a card 10 in the form of a plate a few millimeters thick is shown. That card is typically formed as a body 12 forming the active part and containing the electric components and a frame 13 containing body 2 and provided with a connector 14. The frame will generally be made from molded reinforced insulating plastic material.

Figure 2:
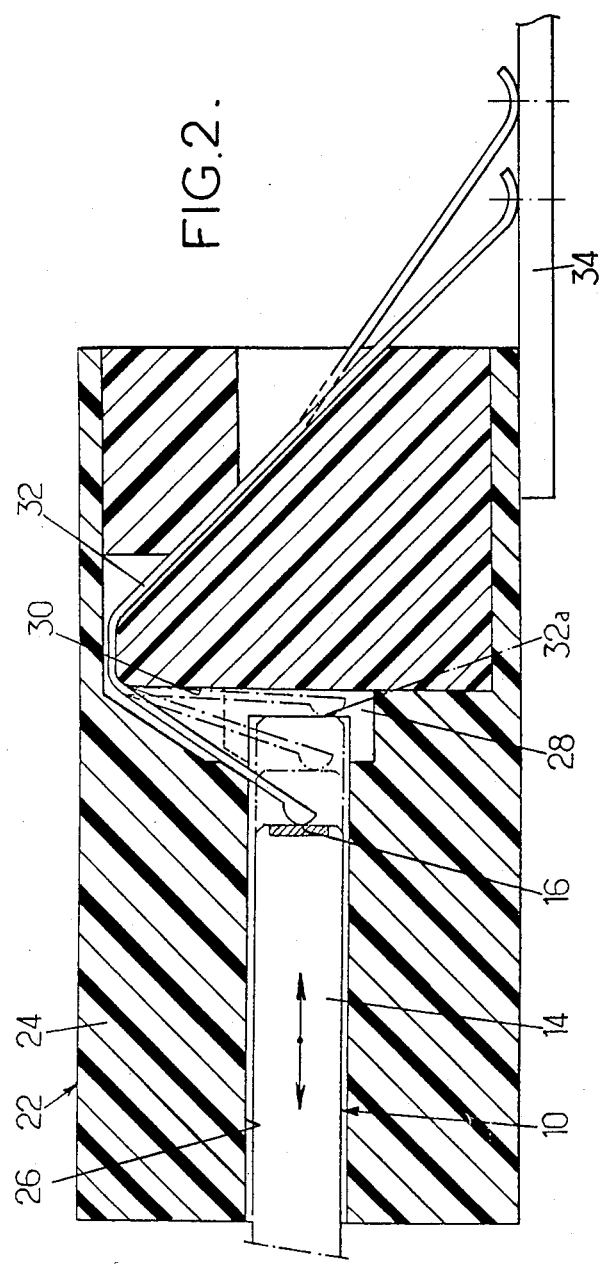
FIG. 2 is a diagram, in cross-section through line II—II of FIG. 1, showing how connection between the contact areas of a card and the contact blades of the case is established during insertion.

In the end edge of connector 14 are formed parallel grooves 16, only one of which is shown schematically in FIGS. 1 and 2. The bottom of each groove is covered, over the major part of its length, with a metal coating constituting an electric contact area 20. The insulating gaps between the contact 20 and the larger faces of the connector (and edge 18 of the connector) avoids contamination of the metal contact by the card user's fingers.

The card is generally provided with polarization means (not shown) preventing it from being inserted in an incorrect orientation. Such means may have any conventional construction. They may be formed as a groove parallel to one of the lateral edges of the card and intended to cooperate with a projection provided in each reading apparatus and which, in addition, participates in guiding the card.

The reading apparatus is not shown completely on the Figures, since its general construction is determined by the characteristics of the card. It includes a reader 22 having a case 24 formed with a card insertion and guidance passage 26 closed by a bottom wall 30 forming a stop. The end part of passage 26, in the vicinity of the bottom, is widened to form a chamber 28 whose function will be discussed hereinafter.

Case 24 carries a plurality of resilient blades 32 in a number equal to that of the contact areas 20 and disposed with the same lateral spacing. The blades have a median part embedded in case 24 and two end parts. The rear end part of each blade 32 forms a lug for connection with a printed circuit board 34 belonging to the reading device (FIG. 2). The front end part is free and forms a resilient electric contact having an end abutment boss. In rest condition, the blades have the shape shown in full lines in FIG. 2 and bear against the wall of chamber 28. The blades are arranged to bend under the thrust of card 10 until they eventually abut against the bottom 30 of the passage which limits the amount of card insertion.

The blades may be made from phosphor bronze or beryllium bronze and may have a thickness of about 0.2 mm; their free front part may be about 10 mm long.

Two sets of blades may be provided, the blades of one set being in a staggered arrangement with respect to the blades of the other. As shown, a single set of blades is provided.

The connection device further includes self-locking means which are enabled and disabled responsive to successive forward actions by the card.

Part of the self-locking means is carried by frame 10. In the embodiment illustrated in the drawings, they include a cam formed on one of the side edges of frame 13. In practice it will be advantageous to provide a cam on each side, for more accurately setting the locked position of the card and for symmetry. The cam 38, which will now be described in detail, cooperates with a resilient bolt 40 carried by case 24. The bolt comprises a bell-crank lever 42 and a resilient blade 46. The bell-crank lever 42 is mounted on the case for rotation about a pin 44 perpendicular to the card 10 when the latter is inserted. The amount of angular movement of the lever is limited by the size of a chamber formed in case 24 for receiving it. That arm of lever 42 carried by pin 44 is securely connected to the foot of the resilient locking blade 46 capable of bending perpendicularly to the introduction plane of the card, on either side of the rest position in which it is shown in FIG. 1.

Figure 3:
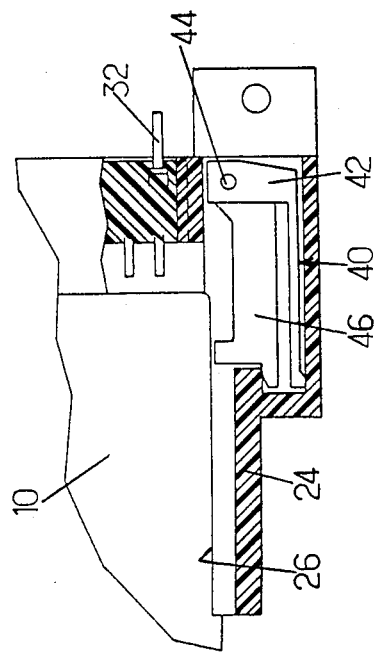
FIG. 3 shows an actual embodiment of the different means shown in FIGS. 1 and 2, as seen from above in FIG. 1.

Referring to FIG. 3, a possible construction of bolt 40 carried by case 24 is illustrated. As shown, the unit formed by lever 42 and resilient blade 46 is retained in the chamber of the case. The resilient blade 46 is arranged to be rotatable outwardly by a limited extent in the plane of the card by resiliently deforming lever 42 whose end is in abutting contact with the chamber wall; on the other hand, it cannot move inwardly from the illustrated abutment position. Blade 46 is free to bend in a direction perpendicular to the introduction plane of the card which is slidably guided in passage 26.

Cam 38 may typically be constructed as shown schematically in FIGS. 4A and 4B which are perspective views from the above and the rear and from the bottom and the front, respectively.

To simplify the description of the cam, those surfaces which have an orientation such that, when the card is inserted, they tend to change the shape of the resilient blade 46 will be designated "front surfaces" and those which do not allow such a force to be exerted will be called "backward surfaces".

The cam has an overall width 2l from the side edge of frame 13. It has at a slanting front face 48 whose width is 2l on the front edge of case 13 and decreases, typically to l, at the rear. At rest, the resilient blade 46 is so located that an end projection 50 thereof is opposite the leading edge of the front face 48 (FIG. 4A). The latter is slanted with respect to the plane of the card so that progressive insertion of the card bends blade 46 downwardly.

The front face 48 merges with a surface 49 (FIG. 4B) which is parallel to the insertion direction and along which the projection 50 may slide while being retained laterally by a side wall 52 whose lateral distance from the side edge of the card frame is equal to l. When the degree of insertion of the card is sufficient for projection 50 to reach the end of surface 49, blade 46 straightens up and the projection, still retained by side wall 52 snaps upwardly and become imprisoned in a dihedron formed of two backward surfaces 54 (FIG. 4A).

The cam has another front surface 56 which is at an angle with the insertion plane of the card, placed rearwardly of surfaces 54. Surface 56 is so located as to bend the resilient blade upwards upon continued insertion of the card. Then projection 50 leaves its abutment against side 52 and moves inwardly into abutment against a second side wall 58, at distance 2l from the side edge of the card frame.

Projection 50 is then free to move clear from the card by sliding along an oblique backward surface 60 if the card moves back.

The device which has just been described operates as follows.

When the card 10 is inserted into the housing, the connector first comes into abutment against the contact blades 32 (as shown with continuous lines in FIG. 2). If card 10 is further inserted, it bends electric contact blades 36. Then the resilient blade 46 of bolt 40 comes into contact with the slanting front face 48 and, as insertion proceeds, there occurs:

sliding of the projection 50 of resilient blade 46 of the bolt on faces 48 and 49 until it snaps up behind surface 49 to cause locking;

bending of blades 32, which may come as far as the position shown at 32a in FIG. 2.

During bending of electric contact blades 32, their contact areas frictionally slide slightly along areas 16 for self-cleaning.

When the card is released after it has been fully inserted, the resilient blades 32 push it rearwardly until the card is retained by the resilient blade 46 of the bolt in the position shown in FIG. 4C.

To prevent the user of the card from then removing the card by pulling it out, it is preferable that passage 26 has a depth corresponding to the length of the card, so that the card projects by a few millimeters only when in reading position. A notch corresponding in lateral size to a user's finger may be formed in the front face of case 24 for rendering insertion easier.

To unlock the card, a second forward thrust is exerted thereon until positive abutment occurs. As shown in FIG. 4D such a forward thrust in the direction of arrow F moves the slanting front surface 56 under projection 50 of the resilient blade 46 which is forced upwardly above the angle between backward surface 60 and edge wall 52. The resilience of lever 42 then causes the projection 50 of blade 46 to snap inwardly above the backward surface 60 into sliding contact with side 58.

Upon release of the card, the resilient contact blades 32 push it back and projection 50 slides along the backward surface 60 until it frees the card, as shown in FIG. 4E.

It will be seen that the invention reduces wear of the end contacts, since the amount of relative sliding movement is only of a few tenths of a millimeter. Since the final electric contact is established in a position of the resilient contact blades intermediate their final positions (as shown in FIG. 1), the connections are made in self-cleaning zones.

Numerous modifications are possible, particularly as regards the thrust-actuated connection and disconnection locking means.

We claim:

1. An electrical connector assembly comprising a card having a plurality of electric current contact areas distributed along a forward end edge thereof; a cam formed on a forward end part of the card; and a connection device for receiving said card, having:
    a reception case defining a card introduction passage limiting insertion of the card to a predetermined extent,
    a plurality of flexible electric contact blades carried by said case and located to come into abutting connection with said contact areas before the card is inserted to said predetermined extent and to exert on the card a force tending to move it back away;
    a resilient bolt carried by the case and operatively cooperating with said cam;
    the cam and the bolt having a construction such that insertion of the card up to an abutment position and return movement of the card by a predetermined extent under the action of the flexible electric contact blades causes locking of the card in a predetermined contact position and so that a second forward movement of the card frees the cam from the bolt.

2. An assembly according to claim 1, wherein the passage has a length such that the card comes into its abutment position when a rear end thereof is substantially flush with an entrance of the passage.

3. An assembly according to claim 1, wherein the contact areas are formed at the bottom of parallel grooves provided in the end front edge of the card.

4. An assembly according to claim 1, wherein said flexible electric contact blades have a form such that they slide over said areas forwardly and rearwardly of a final contact position thereof in a direction orthogonal to the direction of insertion during the insertion movement of the card so that the movements caused by the connection result in self-cleaning of said areas.

5. An electrical connector assembly including a card having electric contact areas formed on a forward end edge thereof and a connection device adapted to have the card to engage contact elements within said connection device upon insertion of said card into said connection device, wherein said connection device comprises:
    a case defining a passage having an introduction opening for insertion of said card into and movement thereof in said case along a predetermined direction with said forward end edge of said card first,
    a plurality of flexible electric contact blades each having a first portion secured to said case and an end portion located in said passage in an insertion path of said card for electrical abutting connection with said contact areas upon insertion of said card, said blades being disposed to be engaged and resiliently bent from a first idle position to a second operating position by abutment with respective ones of said contact areas upon forward movement of said card along said predetermined direction beyond a predetermined degree of insertion; and
    wherein cooperating locking means on said casing and card includes:
    cam means formed on a forward end portion of the card close to said forward edge; and
    resilient bolt means having an end connected to said case and a free end arranged to move along camming surfaces of said cam means,
    said cam means and bolt means being so constructed and arranged that insertion of the card to an abutment position beyond said predetermined degree of insertion and return movement of the card by a predetermined extent under the action of the flexible electric contact blades cause locking of the card in a predetermined contact position and that a second forward movement of the card frees the cam from the bolt means.

6. An assembly according to claim 5, wherein said bolt means includes:
    a crank lever mounted on the case for rotation about a pin of said case perpendicular to an insertion plane of the card, and
    a resilient blade having an end anchored to said crank lever, capable of resiliently bending perpendicularly to the insertion plane of the card, on either side of a rest position for an end projection of the resilient blade remote from the anchored end to follow said cam means.

7. A connection device adapted to have a card having electric contact areas formed on a forward end edge thereof to engage contact elements within said connection device upon insertion of said card thereinto comprising:
    a case defining a passage having an introduction opening for insertion of said card into and movement thereof in said case in a plane of insertion along a predetermined direction with said forward end edge of said card first,
    a plurality of flexible electric contact blades each having a first portion secured to said case and an end portion located in said passage in an insertion path of said card for electrical abutting connection with said contact areas upon insertion of said card, said blades being disposed to be engaged and resiliently bent from a first idle position to a second operating position by abutment with respective ones of said contact areas upon forward movement of said card along said predetermined direction beyond a predetermined degree of insertion; and
    resilient bolt means including:

a crank lever mounted on the case for rotation about a pin perpendicular to said plane of insertion, and a resilient blade having a proximal end anchored to said crank lever, capable of resiliently bending perpendicularly to the insertion plane of the card, on either side of a rest position for a projection of a distal end thereof to move transversely to said plane of insertion, wherein said bolt means are so constructed and arranged that insertion of the card to an abutment position beyond said predetermined degree of insertion caused by applying a pushing force to said card and return movement of the card by a predetermined extent under the action of the flexible electric contact blades cause rotation of said crank lever in a first angular direction and flexure of said resilient blade from said rest position, then locking of the card in a predetermined contact position by said projection and that a second forward movement of the card from said predetermined degree of insertion causes rotation of said crank lever in a direction opposite to said first angular direction and flexure of said resilient blade from said rest position which frees the card from said projection.

* * * * *